United States Patent [19]

Gjessing

[11] Patent Number: 4,730,853

[45] Date of Patent: Mar. 15, 1988

[54] ARRANGEMENT IN A REMOTE-CONTROLLABLE SUBSEA CONNECTOR

[75] Inventor: Harald Gjessing, Kongsberg, Norway

[73] Assignee: A/S Kongsberg Vapenfabrikk, Kongsberg, Norway

[21] Appl. No.: 923,957

[22] Filed: Jan. 27, 1986

[30] Foreign Application Priority Data

Nov. 12, 1985 [NO] Norway ............................ 854510

[51] Int. Cl.⁴ .......................................... F16L 37/08
[52] U.S. Cl. ................................. 285/18; 285/315; 285/320; 285/901; 138/89
[58] Field of Search ................ 285/315, 320, 18, 901; 138/89

[56] References Cited

U.S. PATENT DOCUMENTS

| | | | |
|---|---|---|---|
| 2,952,482 | 9/1960 | Torres | 285/320 X |
| 4,153,278 | 5/1979 | Ahlstone | 285/18 |
| 4,169,507 | 10/1979 | Szymczak | 285/315 X |
| 4,433,859 | 2/1984 | Driver et al. | 285/315 X |
| 4,491,346 | 1/1985 | Walker | 285/18 |
| 4,516,795 | 5/1985 | Baugh | 285/315 |

Primary Examiner—Thomas F. Callaghan
Attorney, Agent, or Firm—Finnegan, Henderson, Farabow, Garrett & Dunner

[57] ABSTRACT

An arrangement in a remote-controllable subsea connector wherein the connector components may be locked together by the aid of a ring of collet fingers (5) cooperating with an actuator ring (17) controllable in the axial direction of said connector. In order to provide secure and efficient locking of said connector without the necessity of exerting very high pressures, and in order to permit compensation of tolerance variations in the connector said actuator ring (17) is provided with a maneuver ring (8) and an annular shaped retaining means which may consist of a ring member, for instance of titium alloy or carbon fibres, or a series of retaining members (7) placed in an annular shape on the inside of said maneuver ring (8), in contact with said fingers (5) in said collet finger ring. Said retaining members (7) cooperate with said maneuver ring (8) via conical surfaces (19, 13). On their surfaces facing fingers (5) said members (7) have a cylindrical portion (12) which cooperates with a plane surface on fingers (5) and transmits the connection forces.

10 Claims, 3 Drawing Figures

ARRANGEMENT IN A REMOTE-CONTROLLABLE SUBSEA CONNECTOR

BACKGROUND OF THE INVENTION

1. Field of the Invention

The invention relates to an arrangement in a remote-controllable subsea connector, especially for use in oil production systems, where the connector components may be locked together by the aid of a collet finger ring and an actuator ring for the fingers, said actuator ring being controlled in the axial direction of said connector.

2. Description of the Prior Art

In subsea systems, especially oil production systems, it is essential that the different components of the system are as reliable as possible and, thus, should also be exchangeable or permit being shut down in a simplest possible manner. This is achieved by dividing the production systems into modules or components which should be easily accessible and permit repairs to be carried out at minimum cost. With such a structure of oil production systems a number of connectors will be used in the pipe systems as well to permit changes being made, components being exchanged, or a pipe being shut down during repair of members, etc.

Great demands are placed on such subsea connectors, not only as regards their reliability and sealing, but as regards remote control as well, which should at the same time safeguard the connector against unintentional release. This may present a problem at great sea depth and, especially, in piping carrying fluids under high pressure.

A number of different connectors have been developed for this object. Thus, a remote-controlled subsea connector is known, where a ring of finger-shaped members is used and placed about the connecting area and which fingers with hook shaped end portions engage in recesses or about flanges on the pipes to be connected. In this connection, it may also, e.g. be a question of a shut down cap of a pipeline. Said collet finger ring conventionally cooperates with an actuator member intended for collecting the fingers of said ring in place to assemble the connector components. Such cooperation is often achieved by the aid of conical exterior faces on said collet finger ring cooperating with corresponding faces on said actuator element and which will press said finger members in place. Conventionally, a cone angle of 4° is used. Due to conicity and interior pressure occurring there will be a tendency for the connection to open-up and for the components to slide apart if the frictional coefficient of the surfaces is too low.

In order to compensate for this locking or blocking members are inserted and these members must be inserted partly with exertion of high force to prevent the finger members from slipping out. Such members may be operated mechanically as well as hydraulically, but they are awkward in use because of the necessity of exact positioning and exertion of relatively high forces. Another known embodiment comprises cooperation between axial faces on the retaining fingers and corresponding axial faces on the actuating element or actuator ring. Such a connection will result in sufficiently secure locking, but it will not be satisfactory as regards a sealed connection with two connector parts being squeezed into mutual engagement and maintained in that state.

The actuator ring elements may be raised and lowered in an axial direction, either by an operating or actuating rod that is provided to form a mechanical connection, or by hydraulic pressure supplied to an annular space between said actuator ring element and a surrounding casing. Said elements may then be designed to provide a hydraulic plunger moving said actuator ring elements up and down. Such operating or actuator mechanisms are known and may be designed in many ways.

SUMMARY OF THE INVENTION

The above mentioned designs, however, do not comply with the demands mentioned above that are placed on such connectors. It is, thus, an object of the invention to provide a connector for undersea use, which is easily mounted and released, which is reliable and at the same time has a simple structure, and which can result in a fluid tight lock even though there are high internal pressures in a pipeline.

Furthermore, it is an object of the invention to provide an arrangement in a connector permitting use of said connector independent of the tolerances taht are unavoidable in such connectors, whereby said tolerances are to be absorbed within the limited radial space at disposal.

These objects are achieved with an arrangement that is characterized by the features appearing from the claims.

By the arrangement according to the invention a connector is provided which in a manner known per se acts by the aid of a collet finger ring that is surrounded and actuated by an actuator ring. Said actuator ring is designed so as to be able to move axially by exertion of forces provided by hydraulic annular pistons or mechanical rods. When said actuator ring member cooperates with said fingers, the latter will be forced backwards and will, thus, lock around two mating end members and a prestress is set up. According to the invention said movement may be exerted with relatively low axial force.

What is novel in this invention is that said actuator ring member is divided into a control or maneuvering ring and a retaining means provided in an annular shape inside said control or maneuvering ring and cooperating with said ring as well as with the collet finger ring. The retaining means may be an annulus element of a titanium alloy or carbon fibres, or it may be constructed as a series or plurality of retaining elements provided in an annulus shape.

This novel intermediate element results in all above mentioned objects of the invention being achieved by the present invention.

BRIEF DESCRIPTION OF THE DRAWINGS

More details and advantages of the invention will appear from the following description of an embodiment shown in the drawings, wherein.

DESCRIPTION OF THE PREFERRED EMBODIMENT

Figure 1:
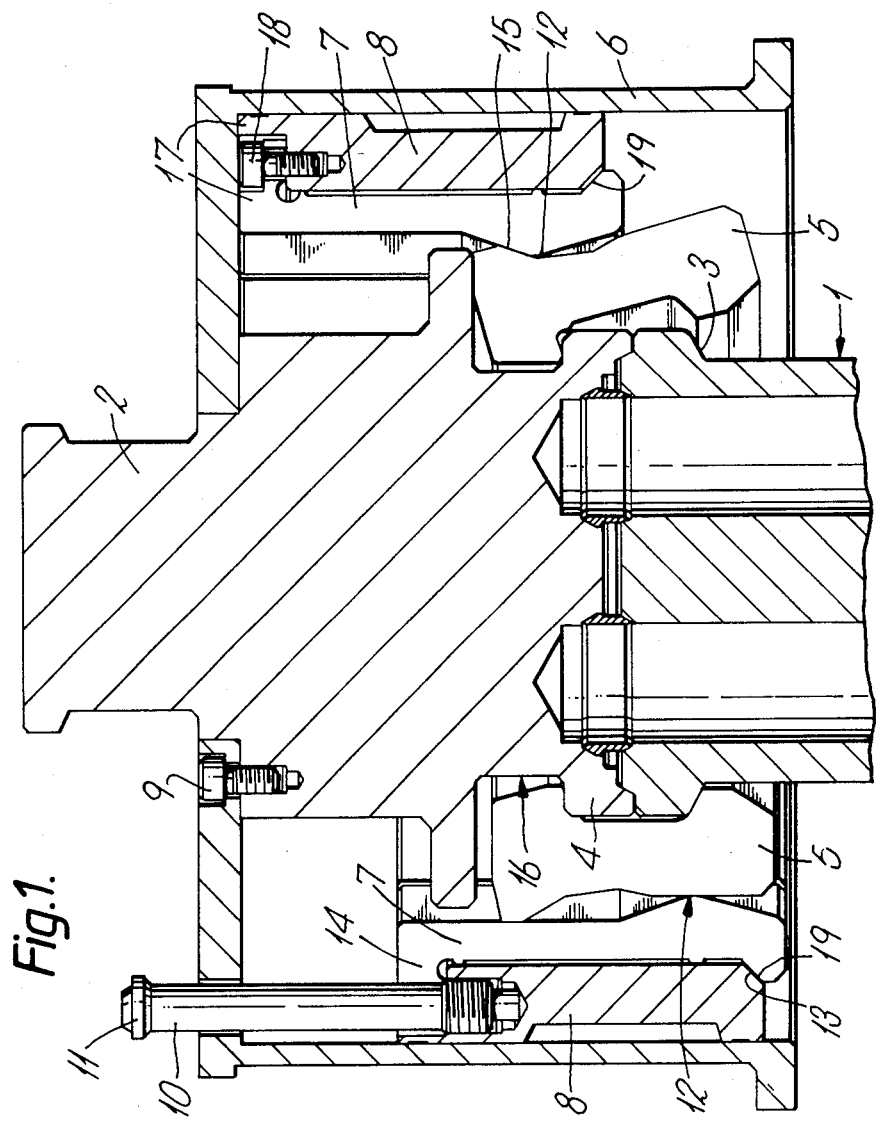
FIG. 1 is a sectional view of a connector designed according to the invention, the position of separate parts in an open position being shown to the right in the Figure, whereas said parts are shown in a locked position to the left.

In FIG. 1, the arrangement according to the invention is illustrated by a connector, where a shut down cap 2 is provided on a pipe 1 having two passages. Instead of cap 2, obviously, any desired extension member of said pipe passages could be utilized, e.g. a manifold or a direction connection. In the embodiment a shut down cap was chosen to make the embodiment easily understandable.

On shut down cap 2 a connector casing is mounted and designated 6 in the drawing. It may be secured to said cap in a suitable manner, e.g. by the aid of a set of screws 9.

Pipe 1 is provided with an end flange 3 intended for cooperation with a matching flange 4 on cap 2. A flange annulus is formed by said two flanges 3 and 4 and is enclosed by an annulus of collet fingers 5, said fingers being provided in a groove 16 shaped above flange 4. Said collet fingers 5 are kept in place in groove 16 by the aid of an actuator ring 17 composed of two parts 7 and 8. Said two parts are connected in their top area, e.g. by screws 18.

The axially exterior element of said actuator ring is annular and called a control or maneuvering ring 8. Said maneuvering ring is intended for maneuvering or moving collet fingers 5 from their open position shown at the right side of the figure to the connected position shown to the left, and back. For this object a suitable number of maneuvering rods 10 is clamped in maneuvering ring 8 and said rods may in their upper region 11 be connected with further rod members or be moved up or and down in the axial direction in another manner.

Said maneuvering ring 8 is in its interior lower region provided with a conical surface 13, e.g. with an inclination angle of 45°, which is intended for cooperation with a corresponding responding surface on part 7, as will be disclosed in more detail below.

The other part of actuator ring 17, i.e. the retaining members 7 provided in an annular shape around the pipe axis, is designed as elongated members forming portions of a cylinder face which extends in the axial direction of the connector. Members 7 are provided with a tolerance against maneuvering ring 8 and with an upper angular portion projecting inward over maneuvering ring 8, and they are secured to said ring 8 as disclosed above. In their lower portion said retaining members 7 are provided with another angular area forming an inclined surface 19 for cooperation with the inclined surface 13 on maneuvering ring 8. On its inside, i.e. the side facing finger 5, said retaining member 7 is designed with a profile surface area 15 intended for cooperation with a corresponding profile surface of the upper area of finger 5 permitting said finger to be pulled up when actuator ring 17 is raised, as illustrated in the right side portion of FIG. 1, or to be moved down when the connector is locked, respectively. Said movement may be carried out with relatively low axial force. This is due to the fact that when member 7 is pushed down, conicity will at the same time approach zero and the force necessary for overcoming said conicity will also be reduced. In previously used purely conical surfaces such overcoming formed an essential part of the axial exertion of force. At the same side of retaining member 7 there is, furthermore, provided a cylindrical area 12 that is intended for cooperation with a cylindrical surface on finger 5 when actuator ring 17 is pushed down into the position shown at the left hand side of the Figure. Dependent on the actual structure angular cylinders may also be considered, but then it must be ensured that the adjacent surface on the finger is matched.

When pipe 1 and cap 2 are connected the fingers will project as shown at the right hand side, maneuvering rod 10 having pulled actuator ring 17 to its upper position. Cap 2 can now be placed. By contact with pipe 1 said rod 10 will be pushed down, which may be done with a comparatively weak force since actuator ring 17 has a very acute cone angle so that a very high force gain is achieved radially squeezing said fingers 5 into the locked position of the connector. This actuation of fingers 5 to make them engage around flange 3 is achieved via retaining members 7 urging against finger 5 in the area of surface 12.

Complications may occur in case of tolerance variation in the pipe and cap flange areas. In order to compensate for such variations which cannot possibly be absorbed within casing 6 due to lack of space, said retaining members 7 were designed with the special shape comprising a clamping surface 14 in their upper portion, a conical contact surface 19 at their lower portion, and an elongated shape with the contact surface with fingers 5 in the lower area, i.e. in the area adjacent contact surface 19.

Figure 2:
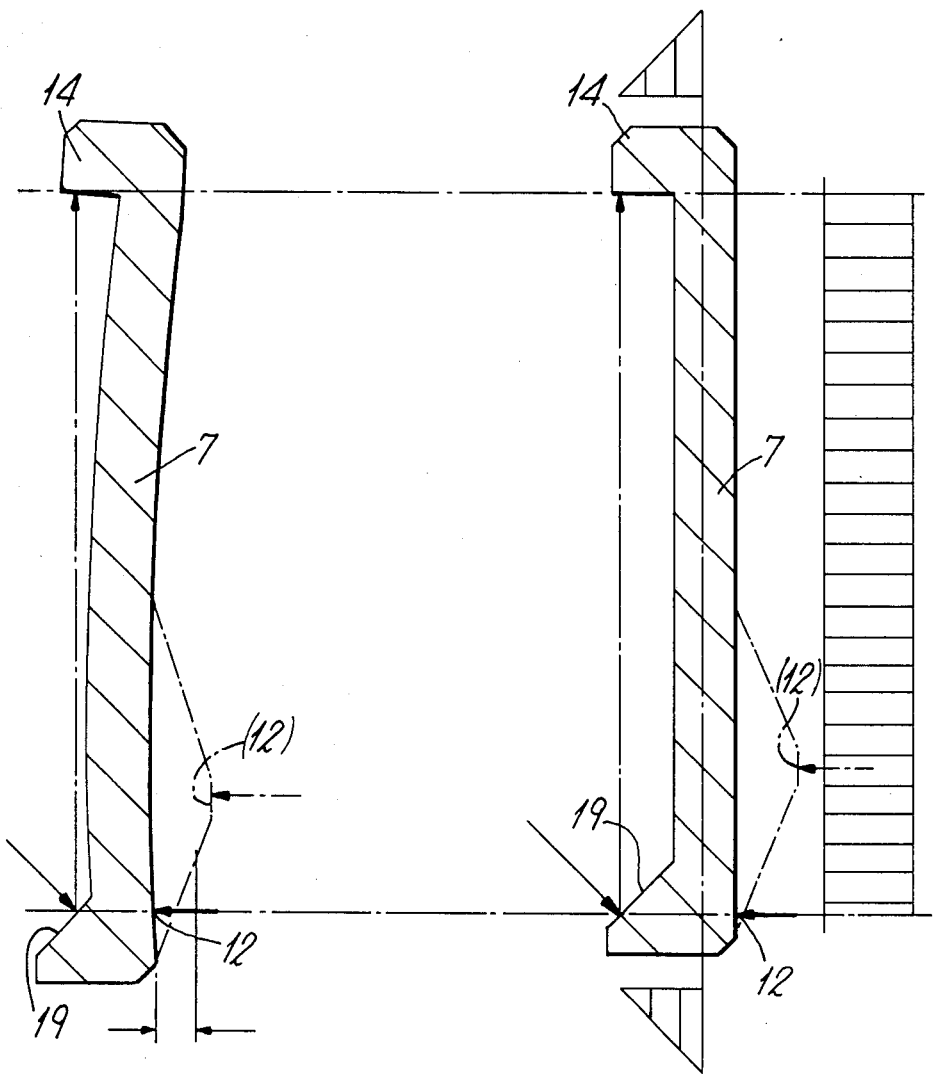
FIG. 2 is a diagrammatic sketch illustrating the load condition of a locking member in an open and a closed state of the connector.

The retaining members must be manufactured from a material ensuring a certain resilience or flexibility. Tolerances that may occur in such a connector will, in the special embodiment, be absorbed by bending and elongation in the axial direction of retaining member 7. This is illustrated in FIG. 2. FIG. 2 shows a member 7 diagrammatically drawn to demonstrate this effect. The shape of said member with contact surface 12 positioned as appears from FIG. 1 and as determined by the special structure as shown in said Figure, is just indicated by dot-and-dash lines. The point of contact and, thus, the surface or place of transmission of the radial forces is placed at the ideal point in the diagrammatical illustration, i.e. in the extension of the conical incline 19. In the opening phase of a loaded state element 7 will be straight, and a uniformly distributed bending moment will be achieved, as illustrated at the right side of FIG. 2. In case of a tolerance variation from this ideal case there will ensue a faint bending of member 7 with an associated elongation of said member, as shown at the left hand side of FIG. 2. Because said end area 14 is firmly secured said elongation will occur in the lower portion of said member and there will ensue displacement of the application point of force on surface 19.

In the ideal case there is, thus, a constant bending moment all over the length of member 7, resulting in good utilization of material. The rigidity of member 7 must be such that full prestress is maintained for a closed connector, and that maximum radial deflection occurs in the optimal position, i.e. close the the load. Maximum load in said member must not exceed the load in other parts of the connector.

Figure 3:
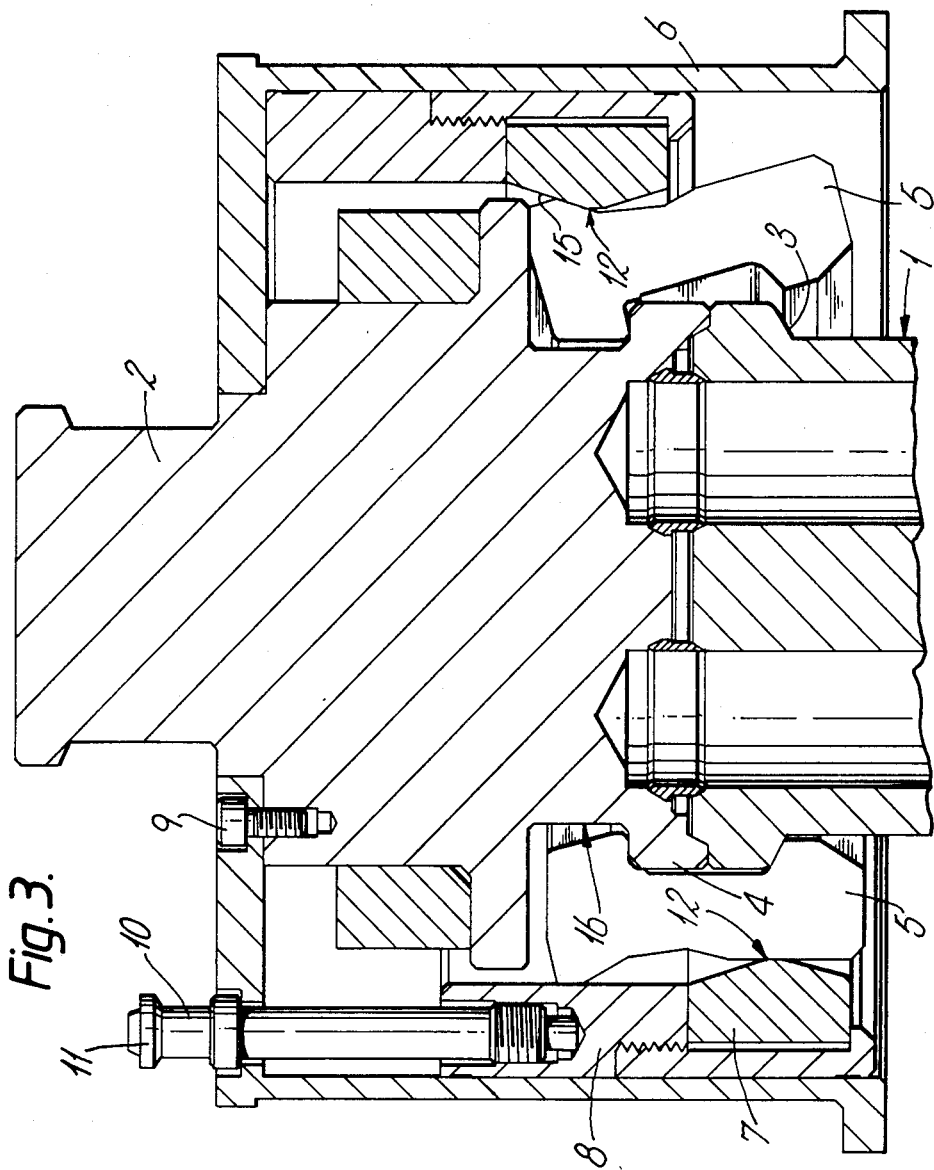
FIG. 3 is a sectional view of a connector, corresponding to the view in FIG. 1, showing another embodiment with the retaining means being a ring.

Finally, FIG. 3 is a sectional view showing an alternative, simpler embodiment, in which the flexible retaining elements are exchanged with a simple ring which must have inherent flexibility in a radial direction. This ring has, in FIG. 3, been marked with the reference number 7, in accordance with the reference used for the corresponding element in FIG. 1. In order to achieve the necessary flexibility and strength, the ring is constructed of a material with high strength and low modules of elascicity in relation to steel rings. Such materials may be a titanium alloy or carbon fibres. Such a ring construction will thus provide the simplest embodiment, but will of course be dependent on the choice of material.

In the drawings only two possible embodiments are disclosed, and it will be obvious to those skilled in the art that many modifications of the design of individual parts is possible within the scope of the invention. Thus, it is, e.g. possible to use hydraulic actuation of said actuator ring instead of the shown mechanical operation, and it will, e.g. also be possible to use a corresponding connector in the area 11 with a maneuver rod 10 of the shown kind. Such a connector at 11 may have a simplified design, since it will not require fluid tightness. There are, thus, many possible modifications within the scope of the invention.

I claim:

1. In an arrangement in a remote-controlled subsea connector, expecially for use in oil production systems, wherein the connector components may be locked together by the aid of a collet finger ring and an actuator ring that is controllable in the axial direction of said connector for fingers of said collet finger ring, the improvement wherein said actuator ring further comprises a maneuver ring, and a radially flexible annular shaped retaining means in contact with the maneuver ring, and positioned against the fingers of the collet finger ring,
   wherein said retaining means is axially movable relative to said collet finger ring between an unlocked position and a locked position, and
   wherein at said locked position, said collet fingers are provided with a cylindrical surface opposing said retaining means.

2. The arrangement according to claim 1, characterized in that the retaining means comprises a plurality of elongated, axially extending retaining members which are provided in an annular shape on the inside of said maneuver ring of said connector across a conical surface, said conical surface facing said fingers being provided with a cylindrical camming portion cooperating with a surface on said fingers during axial movement of said retaining members, said members being bendable in the radial direction.

3. The arrangement as defined in claim 2, characterized in that said conical portion is provided lowermost on said retaining member.

4. The arrangement as defined in claim 2, characterized in that the cylindrical camming portion of the retaining member is provided in the area radially opposite the conical surface.

5. The arrangement as defined in claim 2, characterized in that the conical surfaces have an angle of approximately 45°.

6. The arrangement as defined in claim 2, characterized in that there is an interspace between said maneuver ring and said retaining members for allowing flexing of said retaining member.

7. The arrangement as defined in claim 2, characterized in that said actuator ring is actuated by a rod member secured to said maneuver ring.

8. The arrangement according to claim 1, characterized in that the retaining means is a ring having a low modulus of elasticity in relation to steel.

9. The arrangement according to claim 8, characterized in that the ring is made of a material selected from the group consisting of titanium alloy and carbon fibres.

10. The arrangement according to claim 8, characterized in that there is an interspace between said maneuver ring and said ring for allowing radial expansion.

* * * * *